United States Patent Office 2,820,044
Patented Jan. 14, 1958

2,820,044

SEPARATION OF 21-ACYLOXY PREGNANE OR ALLO-PREGNANE DERIVATIVES FROM MIXTURES CONTAINING THEM

William Graham, Greenford, England, assignor to Glaxo Laboratories Limited, Greenford, England, a British company No Drawing. Application September 13, 1955
Serial No. 534,165

Claims priority, application Great Britain
September 14, 1954

11 Claims. (Cl. 260—397.45)

This invention is concerned with improvements in or relating to the separation of normal or allo-steroids containing a 17α-hydroxy-20-oxo-21-acyloxy pregnane side-chain from mixtures of such steroids and corresponding normal or allo-steroids containing a 17α-hydroxy-20-oxo-pregnane side-chain.

In the synthesis of cortisone it is necessary to elaborate the 17α:21-dihydroxy-20-oxo-pregnane side chain namely

in the 17-position, and in order to do so it has been proposed to utilise the following series of reactions

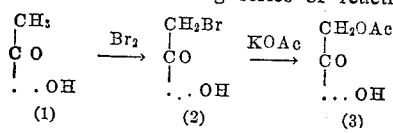

where Ac is an acyl group; the latter type of side-chain may be readily hydrolysed to give a 17α:21-dihydroxy-20-oxo-pregnane side-chain. We have found that in applying this sequence of reactions, the 17α-hydroxy-20-oxo-21-acyloxy compound (3) is frequently contaminated to a serious extent with the starting material of Formula 1. Thus, for example, where these reactions are applied to the compound 3β:17α-dihydroxy-11:20-dioxoallopregnane in order to obtain the corresponding 21-acyloxy compound, due to the difficulty of obtaining the 21-bromide (2) in the pure state and because of the relative insolubility of the starting material, the 21-acyloxy compound obtained is normally contaminated with more than 10% of the starting material. Although small quantities (up to 10%) of this impurity can be eliminated by recrystallisation from the appropriate solvent, this procedure does not work satisfactorily with the more heavily contaminated batches normally encountered.

We have now found that whereas the 17α-hydroxy-20-oxo-pregnane compounds (1) above react readily with Girard reagents, the 17α-hydroxy-20-oxo-21-acyloxy compounds (3) above, do not do so and we are thus able to effect a ready and efficient separation between the two types of compounds. In order that this separation should be effective it is, of course, necessary that no reactive keto-groups, other than that present at the 20-position in the side-chain, should be present in the compounds to be separated. In this connection it should be noted that 11-keto groups are, in general, unreactive. In the present specification, therefore, by the expressions "17α-hydroxy-20-oxo-21-acyloxy compounds of the type referred to" and "17α-hydroxy-20-oxo-pregnane compounds of the type referred to" we mean compounds containing the side-chains (3) and (1) above respectively which do not contain reactive keto-groups substituted in the steroid nucleus, "reactive" meaning in this context keto-groups which will react with a Girard reagent.

According to the present invention, therefore, we provide a process for the separation of a 17α-hydroxy-20-oxo-21-acyloxy compounds of the type referred to from mixtures of such compounds and 17α-hydroxy-20-oxo-pregnane compounds of the type referred to, in which said mixture is reacted with Girard reagents T, carboxymethyltrimethyl ammonium chloride hydrazide $$(CH_3)_3NClCH_2CONHNH_2$$

or P, carboxymethylpyridinium chloride hydrazide, $$C_5H_5NClCH_2CONHNH_2$$

whereafter the 17α-hydroxy-20-oxo-21-acyloxy compound and the Girard derivative of the 17α-hydroxy-20-oxo-pregnane compound are separated by difference in solubility.

In one method of separation the mixture of the Girard derivative and the unreacted 21-acyloxy compound may be separated by extracting the mixture with water whereupon the Girard derivative passes into solution.

We have further found however that in applying the above process to the separation of 21-acyloxy derivatives of 3β:17α-dihydroxy-11:20-dioxoallopregnane from mixtures of them and 3β:17α-dihdroxy-11:20-dioxoallopregnane, the aqueous extraction above referred to can be dispensed with as the Girard derivatives of the latter compound and the unreacted 21-acyloxy compound have varying solubilities in alcoholic solvents such as methanol; thus for example whereas both the Girard derivative and the unreacted 21-acyloxy compound are soluble in hot alcoholic solvents such as methanol, only the former is soluble in cold alcohols. This discovery is important in that the formation of the Girard derivative may conveniently take place in alcoholic solvents and thus in these cases the subsequent separation may be effected simply in the same solvent mixture.

In order to effect the separation therefore, a hot alcoholic solution containing both the 21-acyloxy compound and the Girard derivative may be cooled whereupon the 21-acyloxy compound crystallises out leaving the Girard derivative in solution. In order to recover 3β:17α-dihydroxy-11:20-dioxoallopregnane the filtrate may, for example, be concentrated and treated with a water-immiscible solvent, such as ether, to precipitate the Girard derivative which may be filtered off. The steroid may be liberated from the Girard derivative by dissolving the latter in water, acidifying the solution and recovering the required compound by filtration.

According to a further feature of the invention, therefore, we provide a process for the separation of 21-acyloxy derivatives of 3β:17α-dihydroxy-11:20-dioxoallopregnane from mixtures of them and 3β:17α-dihydroxy-11:20-dioxoallopregnane in which said mixture is reacted with Girard reagent T or P in a hot alcoholic solvent, preferably methanol, in order to form the Girard derivative of 3β:17α-dihydroxy-11:20-dioxoallopregnane and the reaction mixture is cooled, to precipitate the said 21-acyloxy compound which is separated therefrom.

We prefer that the said 21-acyloxy derivative should be the 21-acetoxy derivative.

The formation of said Girard derivative is preferably carried out at the boiling point of the solvent mixture used, which as stated below preferably contains a proportion of acetic acid in addition to the alcohol. The temperature at which the 21-acyloxy compound tends to crystallise out is dependent on its purity, but in general, it has been found to be somewhere below 30° C.

The quantity of Girard reagent to be employed in the process according to the invention should be at least equivalent to the quantity of 17α-hydroxy-20-oxo-pregnane compound present in the mixture to be separated; normally because of the difficulty of analysis a fairly large excess of Girard reagent is employed.

We prefer to carry out the formation of the Girard derivative in methanol containing a proportion of acetic acid; this proportion may be as high as 20% volume/volume but we prefer that the methanol should contain about 2% v./v. of acetic acid. The quantity of acetic acid/methanol to be employed will vary depending on the constitution of the mixture to be treated and the greater the proportion of 17α-hydroxy-20-oxo-pregnane compound present in the mixture, the greater the quantity of solvent to be used; in general the volume of solvent should be kept as low as possible in order to obtain maximum recoveries.

In order that the invention may be well understood, the following examples are given by way of illustration only:

Example 1

A mixture of 21-acetoxy-3β:17α-dihydroxy-11:20-dioxoallopregnane and 3β:17α-dihydroxy-11:20-dioxoallopregnane (135 g. containing 80% of 21-acetoxy compound by infra-red analysis), Girard P reagent (70 g.) and methyl alcohol (1.3 l.) containing acetic acid (26 ml.) was refluxed for 45 minutes. The resulting solution was allowed to cool to room temperature and the crystallisation was completed overnight at 0° C. The solid was filtered off, washed free of acid with methyl alcohol and dried at 100° C. in vacuum. A yield of purified 21-acetate (84 g.) was obtained, having a melting point of 236–8° C. and $[\alpha]_D^{20} +65°$ (0.4% in acetone). An infra-red absorption spectrum analysis showed 98–100% purity.

The mother liquors were concentrated by distillation to a volume of approximately 400 ml. and ether (800 ml.) was added. The precipitated 17-hydroxy-Girard P derivative was filtered off, washed with ether and air-dried. The dry solid was dissolved in hot water (1.5 l.) and the solution adjusted to pH 1 by the addition of concentrated hydrochloric acid (approx. 8 ml.). The precipitated solid was filtered off, washed free from acid with hot water and dried at 100° C. for 3 hours. This material (21 g.) was identified as 3β:17α-dihydroxy-11:20-dioxoallopregnane by infra-red absorption and was found suitable for re-bromination.

The ether-methanol mother liquors were concentrated to 100 ml. and diluted with several volumes of water. The precipitated solid was harvested and contained 75–90% of 21-acetate when assayed by infra-red.

Example 2

A mixture of 21-acetoxy-3β:17α-dihydroxy-11:20-dioxoallopregnane (7.5 g.) and 3β:17α-dihydroxy-11:20-dioxoallopregnane (2.5 g.) was treated as above with Girard P reagent (5 g.) in methanol (80 ml.) containing acetic acid (20 ml.). The recovered materials were: purified 21-acetate (4.3 g.) M. P. 236–8° C., I. R. purity 99%; crude 21-acetate (2.6 g.) I. R. purity 80% and 17-hydroxy compound (1.3 g.).

Example 3

A mixture of 21-acetoxy-3β:17α-dihydroxy-11:20-dioxoallopregnane (5 g.) and 3β:17α-dihydroxy-11:20-dioxoallopregnane (5 g.) was treated as before with Girard P reagent (5 g.) in methanol (90 ml.) containing acetic acid (10 ml.). The recovered materials were: 21-acetate (2.6 g.) M. P. 235–7° C., I. R. purity 100%; crude 21-acetate (1.25 g.), I. R. purity 90% and 17-hydroxy compound (3 g.).

Example 4

Finely milled 3β:17α-dihydroxy-5α-pregna-11:20-dione (500 g.) was suspended with vigorous stirring in chloroform (7.5 l. containing 1.17% alcohol w./w. and 52.4 g. of dry hydrogen chloride). A solution of bromine (229.5 g.) in chloroform (2.5 l.) was added dropwise as fast as the bromine reacted. When all the bromine had been added (125 minutes), ether (7.5 l.) was added. The white solid was collected, washed with ether (2×750 ml.) and air-dried. There was thus obtained 519 g. of 21-bromo-3β:17α-dihydroxy-5α-pregna-11:20-dione.

Hydrogen chloride and hydrogen bromide were removed from the mother liquors by water washing, the chloroform/ether solution was concentrated to small bulk, addition of acetone (50 ml.) and ether (100 ml.), precipitated a white solid. This was harvested as for the first crop yielding 30 g. of the 21-bromide.

The crude 21-bromide (549 g.) was added to anhydrous potassium acetate (800 g.) in acetone (12.5 l.) and the whole was refluxed for one hour. Inorganic salts were removed by filtration, the solid washed with acetone (1.25 l.) and the combined filtrates concentrated in vacuo to 1.5 l. Hot water (1.5 l.) was added and the remaining acetone distilled off. A further 7 litres of water were added, the granular solid was collected, washed with water and dried in vacuo at 80°. There was thus obtained 512 g. of 21-acetoxy-3β:17α-dihydroxy-5α-pregna-11:20-dione (M. P. 230–234°) containing some unreacted 3β:17α-dihydroxy-5α-pregna-11:20-dione.

The crude 21-acetate was refluxed for 30 minutes with Girard reagent P (75 g.) and 2% acetic acid in methanol (5.1). The clear solution was allowed to cool and stand at 0° C. for several hours. The crystalline solid was harvested, washed with a little methanol and dried at 110° in vacuo. There was thus obtained 398 g. of the pure 21-acetate, M. P. 240–242°.

The volume of the mother liquors was reduced to approximately 1.5 l. by distillation in vacuo. On cooling and standing at 0° a second crop of pure 21-acetate of 12.5 g. was obtained.

The methanol mother liquors were poured into a stirred solution of sodium bicarbonate (140 g.) in water (10 l.). Kieselguhr (50 g.) was added and the solution clarified by filtration through a pad of kieselguhr. The filtrate was acidified with concentrated hydrochloric acid (200 ml.) and heated at 100° for 30 minutes. The precipitated solid was collected by filtration and washed with water and methanol (200 ml.). The solid was then refluxed with methanol (500 ml.) for 30 minutes, the suspension cooled, filtered and the white solid washed with a little methanol. After drying at 80° in vacuo there was obtained 66 g. of 3β: 17α-dihydroxy-5α-pregna-11:20-dione M. P. 274–278°.

While the invention has been described with particular reference to 21-acetoxy steroids, it will be clear that the function of the acyl group at position 21 is protective: thus many acyl groups may equally be present at this position. We prefer such acyl groups as are derived from a lower aliphatic acid containing from 2–8 carbon atoms and which may be substituted with inert substituents, such as halogen, nitro-, alkoxy, etc., groups. Examples of such acids are acetic, propionic, butyric, isobutyric, valeric, caproic, chloracetic and chlorpropionic acids. Preferably the carboxylic acid should be one in which the α-carbon atom bears at least one hydrogen atom.

I claim:

1. A process for the separation of a 21-acyloxy-3β:17α-dihydroxy-11:20-dioxoallopregnane in which the acyl radical of the acyloxy group is derived from a lower aliphatic acid containing from 2–8 carbon atoms from its mixture with a 3β:17α-dihydroxy-11:20-dioxoallopregnane unsubstituted at the 21-position, comprising reacting said mixture with a Girard reagent selected from the group consisting of carboxymethyltrimethyl ammonium chloride hydrazide and carboxymethylpyridinium chloride hydrazide and separating the unreacted 21-acyloxy compound from the Girard derivative of the unsubstituted allopregnane by difference in solubility.

2. The process of claim 1 in which said acyloxy group is an acetoxy group.

3. A process as claimed in claim 1, in which the separation is effected by extracting the mixture of the Girard derivative and the 21-acyloxy compound with water and separating the 21-acyloxy compound from the resulting aqueous solution of the Girard derivative.

4. A process as claimed in claim 3, in which the aqueous solution of the Girard derivative is acidified, after removal of the 21-acyloxy compound, in order to liberate and precipitate the 17α-hydroxy-20-oxo-pregnane compound which is then recovered.

5. The process of claim 1 in which said mixture is reacted with said Girard reagent in a hot alcoholic solvent, the reaction mixture is cooled to precipitate the 21-acyloxy compound, and the precipitated 21-acyloxy compound is separated from the remaining solution of said Girard derivative.

6. A process as claimed in claim 5, in which the solution of the Girard derivative is treated with a water-immiscible solvent, after removal of the 21-acyloxy compound, in order to precipitate the Girard derivative, the latter is isolated, dissolved in water and the aqueous solution is acidified in order to liberate and precipitate 3β:17α-dihydroxy-11:20-dioxoallopregnane which is then recovered.

7. A process as claimed in claim 6, in which the water-immiscible solvent is ether.

8. The process of claim 5 in which said alcoholic solvent is methanol.

9. A process as claimed in claim 8, in which the methanol contains up to 20% volume/volume of acetic acid.

10. In a process for the preparation of 21-acyloxy-3β:17α-dihydroxy-11:20-dioxoallopregnanes, in which the acyl radical of the acyloxy group is derived from a lower aliphatic acid containing from 2–8 carbon atoms, by brominating 3β:17α-dihydroxy-11:20-dioxoallopregnane and treating the resultant 21-bromo-3β:17α-dihydroxy-11:20-dioxoallopregnane to yield a reaction product containing the desired 21-acyloxy compound in admixture with unchanged starting material, the steps which comprise reacting said reaction product with a Girard reagent selected from the group consisting of carboxymethyltrimethyl ammonium chloride hydrazide and carboxymethylpyridinium chloride hydrazide and separating the desired 21-acyloxy compound from the Girard derivative of the unchanged starting material by difference in solubility.

11. The process of claim 10 in which said acyloxy group is an acetoxy group.

References Cited in the file of this patent

UNITED STATES PATENTS 2,656,367    Graber _____ Oct. 20, 1953

OTHER REFERENCES

Fieser et al.: Natural Products Related to Phenanthrene, 3rd ed., pp. 308–09, 405–06 (1949). (Copy in Pat. Off. Sci. Lib.)